Sept. 2, 1969    R. L. MOTLEY    3,464,151
CHILD'S RATTLE WITH BELLS AND SIMULATED ANIMAL
Filed Oct. 7, 1966    3 Sheets-Sheet 1
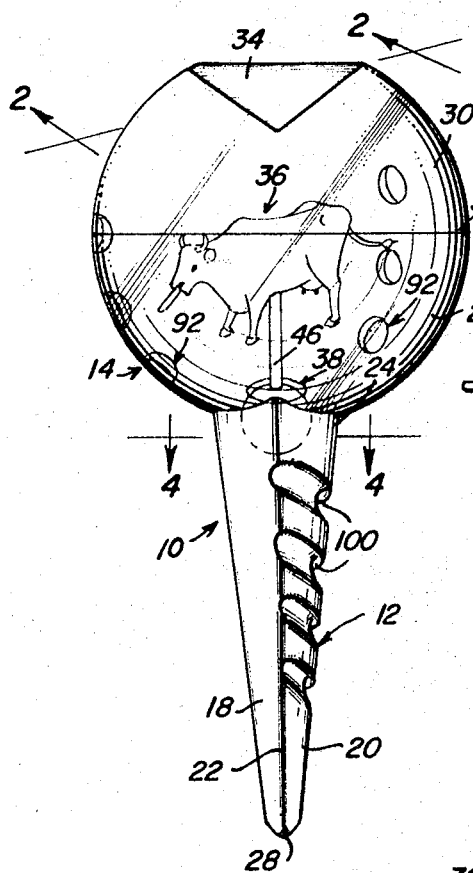
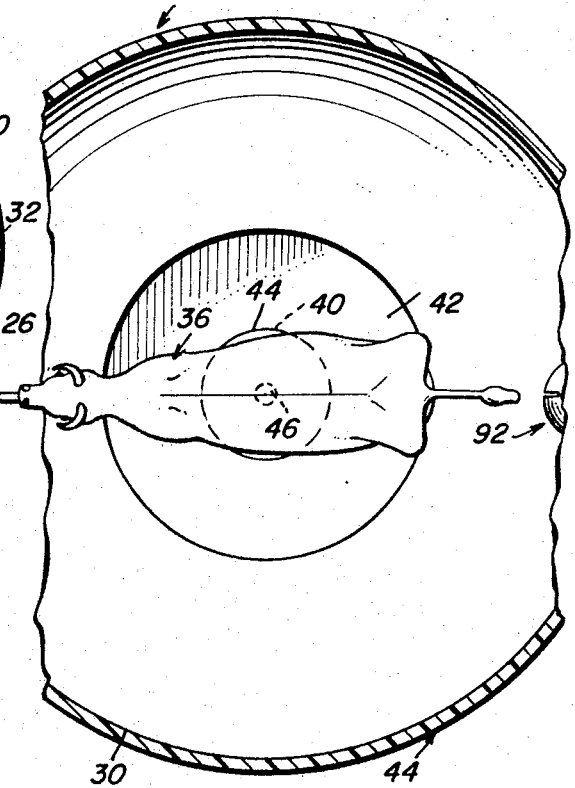
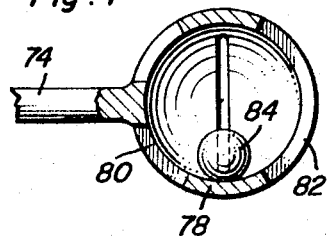
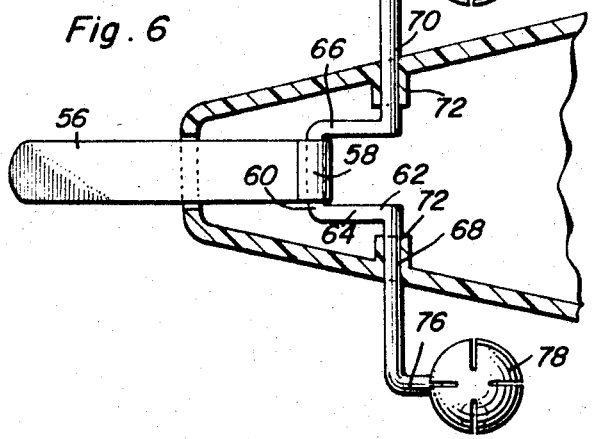
Robert L. Motley
INVENTOR.

Sept. 2, 1969    R. L. MOTLEY    3,464,151
CHILD'S RATTLE WITH BELLS AND SIMULATED ANIMAL
Filed Oct. 7, 1966    3 Sheets-Sheet 2
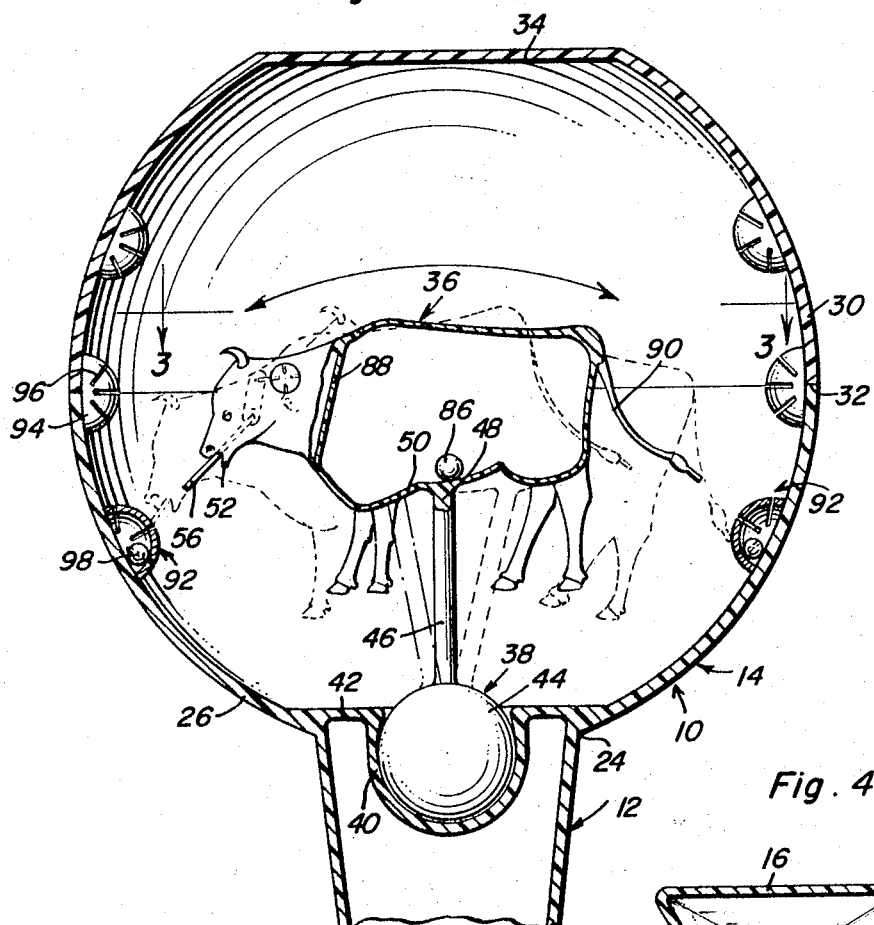
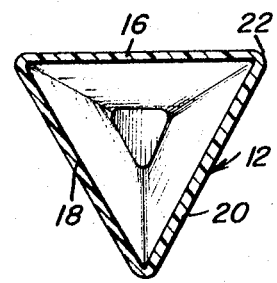
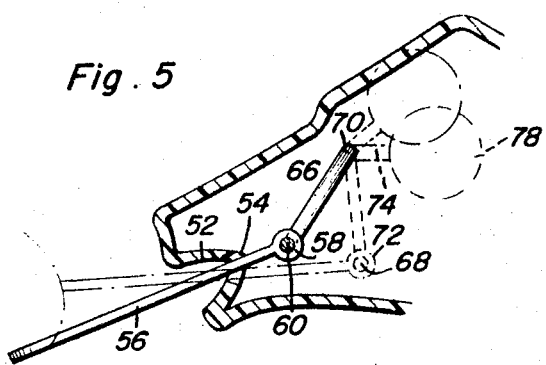
Robert L. Motley
INVENTOR.

Sept. 2, 1969  R. L. MOTLEY  3,464,151
CHILD'S RATTLE WITH BELLS AND SIMULATED ANIMAL
Filed Oct. 7, 1966  3 Sheets-Sheet 3

Robert L. Motley
INVENTOR.

BY *Clarence A. O'Brien*
and *Harvey B. Jacobson*
Attorneys

United States Patent Office 3,464,151
Patented Sept. 2, 1969

3,464,151
CHILD'S RATTLE WITH BELLS AND
SIMULATED ANIMAL
Robert L. Motley, P.O. Box 369
Madison, Conn. 06443
Filed Oct. 7, 1966, Ser. No. 585,131
Int. Cl. A63h 5/00
U.S. Cl. 46—175                                    17 Claims

ABSTRACT OF THE DISCLOSURE

A child's rattle having a hollow body and a hollow handle extending therefrom each having sound producing elements therein. An animal is universally supported in the body which has transparent characteristics to enable observation thereof with the animal including a movable component operative in response to movement of the rattle.

---

This invention generally appertains to improvements in children's toys or kinetic type amusement devices and more particularly relates to a novel rattle for use by children from an early infant stage to later stages of physical and mental development. Thus, the novel rattle of the present invention is not limited solely for use by infants in the early six to twelve month stage of development but will find appeal with older children because of its unique qualities.

An important object of the present invention is to provide a novel rattle which is extremely amusing and entertaining by virtue of the fact that it possesses correlated visual and tonal features.

Another important object of the present invention is to provide a rattle which has a transparent body portion or casing within which an element, which may be simulative of an animal, human figure such as a small child or any other animate or inanimate object with the element being so mounted in the transparent body portion or casing that it is capable of executing universal movements much to the amusement and delight of the child who can view the movements of the element through the transparent wall structure of the body portion or casing.

An important feature of the present invention resides in the universal mounting of the element within a transparent body portion or casing and the construction of such movable element with moving parts such parts being movable upon shaking of the body portion or casing through a handle portion associated therewith and such movements being extremely entertaining and amusing to infants and small children.

Another important object of the present invention is to provide, in association with the moving parts of the element, sound means that react to such movement of the moving parts so that not only is a visual factor involved but also an audible or tonal factor is involved, which lends itself to the amusement and entertainment qualities of the rattle.

A still further important object of the present invention is to provide a rattle which is composed of a transparent body portion or casing and a handle portion in integral association at one end with the body portion or casing, the handle portion being hollow and being constructed with sound producing means that can be easily and simply produced by even small infants.

A still further important object of the present invention is to provide a rattle, in accordance with the preceding objects, which is extremely simple in construction, attractive in appearance, extremely safe for use by even a small infant, from a standpoint of physical damage to the infant's body or injury to the infant because of the infant sucking or chewing thereon, highly amusing and entertaining and, in keeping with requirements of devices of this type, is capable of being manufactured and distributed on a volume basis at an extremely low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective of a rattle constructed in accordance with the present invention;

FIGURE 2 is a vertical cross-sectional view, taken substantially on line 2—2 of FIGURE 1, and being on a larger scale than FIGURE 1;

FIGURE 3 is a fragmentary, horizontal cross-sectional view taken substantially on line 3—3 of FIGURE 2 and showing the element within the body portion or casing in top plan;

FIGURE 4 is a transverse, cross-sectional view, taken substantially on line 4—4 of FIGURE 1 and illustrating in detail the construction of the handle portion;

Figure 8:
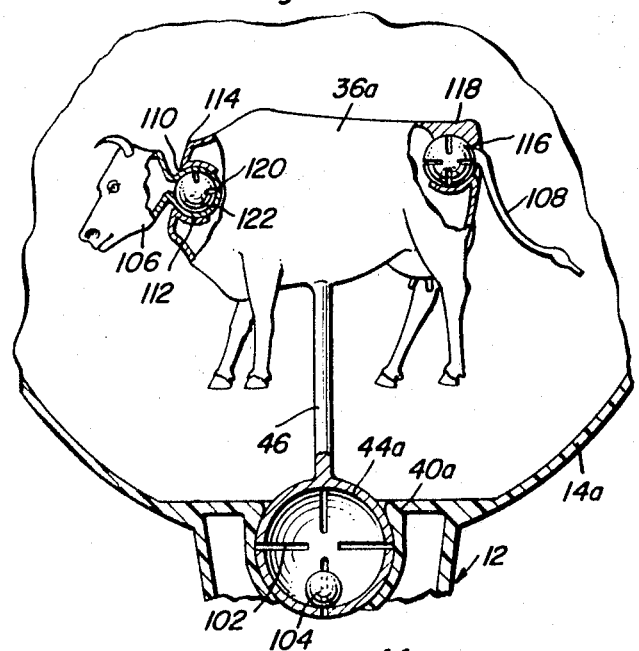
Figure 10:
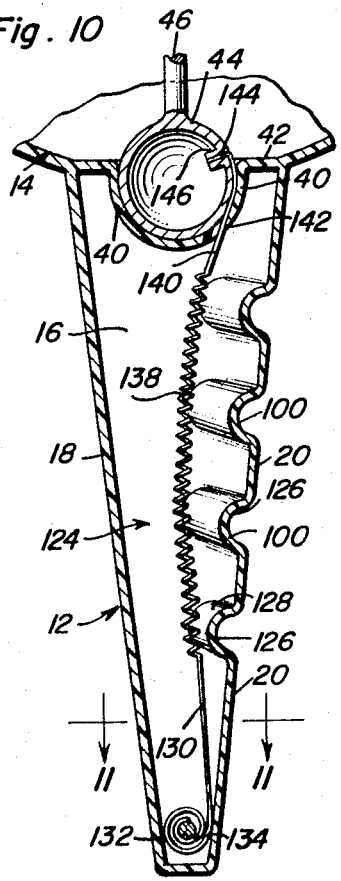
Figure 9:
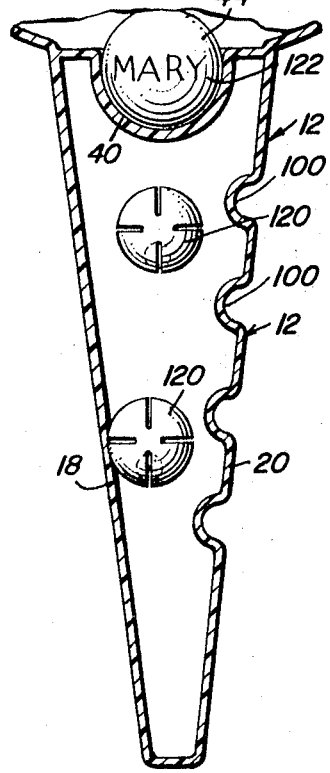
Figure 11:
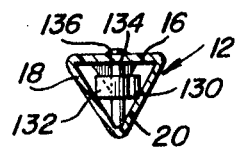

FIGURE 5 is a fragmentary, vertical sectional view, illustrating the manner in which the tongue of the animal is moved inwardly and outwardly from the animal's head, such showing of an animal or a particular animal and the relative inward and outward movability of a portion of its anatomy being merely for exemplary purposes, since it is to be understood that the element can be simulative of any animate or inanimate object and would have moving parts structurally related thereto in the manner as shown in FIGURE 5;

FIGURE 6 is a transverse sectional view, taken through the animal's head, and illustrating in top plan the projecting tongue and the means for mounting the same in structural association with the head of the animal;

FIGURE 7 is a fragmentary, sectional view, taken substantially on line 7—7 of FIGURE 6 and illustrating the bell means provided on the projecting ends of the crank-like actuating arm for projecting and retracting the tongue from the animal's mouth;

FIGURE 8 is a detailed, vertical sectional view of the lower portion of the body portion or casing and the upper end portion of the handle portion and showing the element partly in section, with respect to a modified form of mounting the moving parts thereof;

FIGURE 9 is a longitudinal sectional view of a modified handle portion and slightly varied mounting arrangement of the element disposed within the body portion or casing;

FIGURE 10 is a longitudinal sectional view of a modified form of handle portion and illustrating a noise producing means mounted therein, and, FIGURE 11 is a transverse, cross-sectional view, taken substantially on line 11—11 of FIGURE 10.

Referring now more particularly to the accompanying drawings and initially to FIGURES 1 through 7, the numeral 10 generally designates the rattle of the present invention. The rattle essentially comprises a handle portion 12 and a body portion or casing 14, which are in integral association and which are formed from transparent, flexible but sturdy and non-toxic material, such as transparent rubber or any of the well-known commercial plastics, such as polyvinylchloride.

The handle portion 12 is hollow and is in the form of an equilateral triangle in cross-section, as shown in FIGURE 4, so that it is composed of side walls 16, 18 and 20 with the juncture points or outer edges of the side walls being rounded, as indicated by the numeral 22, thereby eliminating any sharp projections. The handle portion 12 has an inner end portion 24, which is formed integral with the bottom half section 26 of the body portion or casing 14 and the handle portion tapers inwardly from such inner joined end 24 to a very reduced free end 28. It is to be pointed out that the edges of the free end 28 are rounded off, as are the edges 22, so that there are no sharp projections on the handle portion which would cause any injury to an infant's hands in holding the handle portion or any injury to an infant's mouth in sucking or teething on the handle portion. And, in the latter respect, it is to be realized that, as aforestated, the entire rattle 10 is formed from non-toxic material so that any portion thereof can be placed in the mouth.

The body portion or casing 14 is comprised of the lower section 26 and an upper section 30, the two sections being joined together at their mating edges, as indicated by the reference numeral 32 in any suitable fashion so as to create the spherical hollow form of the body portion or casing 14. The upper section 30 is formed with a top flattened end section 34, which is desirably triangular in planar configuration. The flat triangular top 34 of the upper section 30 serves to reinforce the outer end of the body portion, that is the end opposite the handle attached end. In addition, the flat top can be used to have suitable data inscribed or otherwise provided thereon, such data being, for example, in the nature of the name and birth date of a child.

The purpose of forming the spherical body portion or casing 14 in two separate halves, that is, the lower section 26 and the upper section 30 and then securing, as by bonding or the like, the mating edges thereof, as at 32, is for the purpose of enabling an element, generally designated by the reference numeral 36 to be more easily and readily placed within the interior of the body portion or casing 14. Of course, it is to be understood that the element can be predisposed within the body portion before the same is molded in a one piece construction but, in any event, the body portion is of integral formation because the bottom and upper sections 26 and 30 are in integral structural relationship.

With reference to the element 36, the same has been illustrated, merely for exemplary purposes, as a quadruped animal, more particularly a cow. While the element 36 and its mounting arrangement and its moving parts will be hereinafter referred to as a cow, it is to be understood that the element 36 can be simulative of any animate or inanimate object and would be mounted in the same way, as will be described, and would have moving parts, structurally associated and operative therewith, as in the instance of the moving parts of the cow 36, as will be described.

The cow figure 36 is conventional, in its appearance, and is formed in one piece from material, similar to the material used in the formation of the handle portion 12 and the body portion or casing 14. Thus, the body of the cow 36 is formed from a flexible but sturdy transparent rubber or plastic material. Mounting means 38 is provided for mounting the cow 36 within the body portion or casing 14 so that the cow has a universal movement with respect to the handle portion 12 and the body portion or casing 14 and, in view of the inherent transparent nature of the body portion 14, the various movements of the cow will be visible for the amusement and entertainment of a child.

The mounting means 38, as shown more particularly in FIGURE 2, comprises a semi-spherical socket 40, which is formed as an integral dependency on a transverse partition 42, the partition 42 constituting an internal separation wall between the inner end of the handle portion 12 and the lower section of the body portion or casing 14. A spherical ball 42 is universally socketed in the socket 40 and is formed with an upstanding rigid or, at least, semi-rigid or hard, stem 46 which is formed integral with or otherwise attached at its upper opposing end 48 to the underside 50 of the cow. The stem 46 thus interconnects the spherical ball 44 and the cow 36 and the stem is attached to the underside of the cow so that the cow is normally balanced, as indicated by the full lines in FIGURE 2, in a central static position within the body portion 14. However, upon movement of the body portion, as by grasping the handle portion 12 and shaking the body portion or casing 14, the cow will move back and forth, sideways, in a circle and execute almost unlimited universal movements, due to the ball 44 and socket 40 mounting arrangement for the cow element 36.

As an added or ancillary visual attraction, it is proposed that certain parts of the cow be extended or projected outwardly therefrom, responsive to certain of the universal movements carried out by the cow in response to physical shaking of the rattle 10. The conceptual factor is that any of the elements, which would normally be extensible and retractable by a cow, would be formed so that they would extend and retract responsive to the shaking of the rattle.

Thus, for example, the mouth portion 52 of the cow is formed with an opening 54, through which an elongated reed or blade 56 projects, the reed or blade being simulative of the tongue of a cow. The inner end of the projectable and retractable reed or blade 56 terminates in a transversely disposed collar 58, which is freely circumposed on the web or bight portion 60 of a U-shaped member 62, which also has opposing legs 64 and 66. The legs 64 and 66 have integral, laterally outstanding journaling arms 68 and 70, which pass through integral bearing or journal supports 72 formed on the interior of the head portion of the cow. The journaling rods 68 and 70 terminate in rearwardly directed angular end projections 74 and 76, which have bells 78 formed on their free or outer ends.

As shown more clearly in FIGURE 7, the projection 74 is integral with a spherical housing 80 which has radial slits 82 formed therein and which is hollow to contain a small bead or ball bearing 84. Such construction constitutes the bell arrangement which is shown for exemplary purposes, since any type of bell arrangement can be provided on the ends of the journalling rods 68 and 70.

From a consideration of FIGURE 5, it can be appreciated that due to the crank-like construction of the rod arrangement, which constitutes the pivotal and rotatable support for the extensible and retractable reed or blade 56, the reed or blade can not only extend outwardly through the opening 54 but can move upwardly and downwardly in its extended or projected condition. This will all the more simulate the actual tongue movements of a cow.

A bell 86, which is of conventional construction and is constructed along the lines of the bell 78, is freely rotatably disposed within the hollow body of the cow element 36 and its movements are only restricted by the back and side wall portions and by a transverse webbing 88 formed interiorly of the cow and disposed immediately rearwardly of the head portion of the cow.

The cow is formed with a substantially firm tail 90 though it is to be understood that the tail could have a movement relative to the body portion of the cow element 36.

In order to enable the rattle to not only have a very high degree of visual enjoyment and amusement by a child but also, to provide audible tinkling bell sounds, bell means 92 are formed on the inner surfaces of the housing 14. The bell means 92 each essentially comprises a semi-spherical housing 94, having slits 96 and within which a bead or ball bearing 98 is freely disposed, so that as the body portion is moved, the bells 92 are caused to tinkle. In this respect, the tonal quality will be one of a so-called tinkling sound.

Certain of the bells, as can be appreciated from a consideration of FIGURE 2, will be strategically located on the interior or inner surface of the bottom section 26 of the body portion or casing 14 so that they will be struck by the projecting reed or blade 56 and by the tail 90 as the cow element is rocked back and forth in that particular plane. Of course, this action can be deliberately produced, since the universal movement of the cow element 36 can be either deliberately controlled or the cow element can be free, if no effort is made to control its movements, to rotate, wobble or roll to and fro, back and forth and sideways or round and round.

In order that the handle portion 12 can be more securely gripped by the hand and, therefore, to achieve a better control of movements of the cow movement 36, the side wall 20, as shown in FIGURE 1, is formed with a series of transverse indentations 100, which indentations are spaced along the length of the side wall 20 and are formed on the exterior thereof. The indentations define finger receiving notches or grips, whereby the handle portion 12 can be more securely and effectively held in the hand. This will permit greater control over the movements of the cow element 36, the movements thereof being induced by the shaking of the rattle 10 and being effected by virtue of the universal ball and socket mounting arrangement, as shown in FIGURE 2 and as aforedescribed.

A slightly modified form of universal mounting arrangement for the element within the transparent body portion or casing and for the movements of certain parts of the animal element's anatomy is shown in FIGURE 8. As shown therein, the socket 40a is similar to the socket 40 and receives a spherical ball 44a, the physical or structural association being identical to the ball and socket arrangement 40 and 44 of the form shown in FIGURES 1 through 7. However, in the instance of the form of FIGURE 8, the ball 44a is hollow and constitutes not only a structural means for universal attachment of the cow figure element 36a to the body portion 14a but also serves as a noise producing medium. In the latter respect, the hollow spherical ball 44a is formed with slits or slots 102 and a spherical bead or ball bearing 104 is freely disposed within the hollow ball member 44a so that as the cow element 36a is moved, in its universal movements by virtue of the ball and socket arrangement 44a and 40a, the ball 44a functions as a tinkling bell.

The cow figure 36a is formed with a movable head portion 106 and a movable tail portion 108. The head portion 106 is provided with a spherical ball 110 which is universally socketed in a socket 112 formed at the front portion 114 of the body of the cow figure 36a. The ball 110 is integral with the head portion 106 and the socket 112 is integrally molded or formed with the body portion of the cow figure 36a. Consequently, upon movement of the cow figure 36a through the universal mounting arrangement 40a and 44a, the head 106 is free to move, due to the universal socket and ball arrangement 112 and 110, in any desired movement and to execute any universal movements.

The tail 108 terminates in an integral ball 116 which is universally disposed in a socket 118 formed in the rear end portion of the cow figure 36a. Accordingly, the tail is free to move, in any desired movements, as the cow figure 36a is given a rocking, wobbling or any other motion.

It can be appreciated that the universal mounting of the head portion 106 and the tail portion 108 will serve as a source of amusement and visual interest to a child and that the child through proper manipulation of the body portion 14a, through shaking or moving the same by grasping the appurtenant handle portion, can cause the cow figure 36a to move in any desired manner, whereupon certain attendant and correlated movements of the head portion 106 and tail portion 108 will follow.

To add to the versatility of the arrangement, as shown in FIGURE 8, each of the ball elements 112 and 116, which constitute with their respective retaining sockets the means for universally mounting the head portion 106 and tail portion 108, the ball elements 110 and 116 are formed as bells so that as, in the instance of the ball 110 shown in section in FIGURE 8, the ball is hollow and is provided with slits 120 and a small spherical bead or roller bearing 122 is freely disposed within the ball 110. Therefore, when the head portion 106 or the tail portion 108 execute any of their various universal movements, the mounting balls 110 and 116 will give off a tinkling sound. As illustrated in FIGURE 9, the handle portion 12 can serve as a housing for the spherical tinkle bells 120, the bells being freely housed within the confines of the hollow handle portion 12 and being movable at will or as an effect of the shaking of the handle portion 12 by a child. This will lend a noise producing attribute to the handle portion 12. Further, as shown in FIGURE 9, the ball 44 may have the name of the child, as indicated by reference numeral 122, inscribed or suitably formed thereon. This will not only identify the rattle as belonging to a particular child but will also serve to delight the child, as the child begins to recognize his or her own name and to watch the name as the ball 44, wobbles, spins, rotates or otherwise moves universally within the socket 40.

A further noise producing means 124, which is in structural association with the handle portion 12, is illustrated in FIGURES 10 and 11. With reference to such figures, it can be appreciated that the finger indentations 100 formed in one of the walls of the handle portion 12, as for example the wall 20, as shown in FIGURE 1, will have concave outer surfaces 126 to freely accommodate the fingers of the child and, therefore, will have convex inner surfaces 128. The convex inner surfaces 128 play a part in the noise producing means 124, as will be described. The means 124 includes an elongated strip of metal or suitable plastic 130, which is wound or coiled, at its lower end portion 132 on a shaft 134 disposed transversely adjacent the lower or outer free end portion of the handle portion 12. The pin or shaft 134 has an exterior head 136 which can be utilized so as to tighten the coil 132. The portion of the strip 130, which overlies and extends over the convex surfaces 128 is corrugated, as indicated by the reference numeral 138. The upper end portion 140 of the strip is passed through a slit 142 formed in the socket 40 and is anchored at its outermost end 144 in a frictional gripping slot 146 formed radially and interiorly of the ball element 44. The mounting arrangement of the upper end portion 142 of the spring or plastic strip is such, as can be realized from a consideration of FIGURE 10, that the presence of the strip will not interfere with the universal movements of the ball 44 in the socket 40.

When the finger indentations or recesses 100 are griping of a guitar or ukulele string. Obviously, the child repeatedly does this, the convex sides or surfaces 128 will come into rubbing contact with the corrugated portion of the strip and this will give off a very audible sound which will be somewhat in the nature of the plucking of a guitary or ukulele string. Obviously, the child can learn to use one or more fingers and to use all of the fingers in various ways so as to achieve different sounds.

What is claimed as new is as follows:

1. A rattle comprising a handle portion, a hollow body portion having a wall structure carried by an end of the handle portion and including a substantial transparent area, an element disposed substantially centrally in said body portion and visible through the transparent area of the wall structure thereof, means mounting the element in the bottom portion of the body portion for universal movement of the element relative to the body portion, said mounting means comprising a semi-spherical socket formed in said bottom portion, a spherical ball universally mounted within said socket, and a stem portion connecting the element in the body portion with the ball.

2. The invention of claim 1, wherein said body portion is substantially spherical and is composed of a lower section in structural association with the handle portion and an upper section having a triangular shaped flat end.

3. The invention of claim 1, wherein said handle portion is of triangular cross-sectional configuration and is hollow and is in integral association with the body portion, said body portion being substantially spherical.

4. The invention of claim 1, wherein said handle portion and body portion are hollow and are separated by a transverse wall.

5. The invention of claim 4, wherein said element has moving parts which move in response to various movements of the element.

6. The invention of claim 5, wherein said element has its moving parts universally connected therewith.

7. The invention of claim 6 wherein the moving parts of said element are provided with balls and said element is provided with sockets for the universal reception of the balls whereby the moving parts are mounted for universal movement.

8. The invention of claim 7, wherein said balls constitute tinkling bells.

9. The invention of claim 5, wherein the inner surface of the body portion is formed with bells.

10. The invention of claim 9, wherein the moving parts of said element are associated with certain of the bells so as to strike the same.

11. The invention of claim 10, wherein the bells are fixed on the inner surface of the body portion.

12. The invention of claim 5, wherein said moving parts include at least one outwardly projecting blade, said element having a slot for the free extension and retractive movements of the blade and means mounting the blade in the element.

13. The invention of claim 12, wherein said last means includes a crank-like shaft having a central throw portion with the blade having an inner collar end freely circumposed on the throw portion and said crank having shaft ends rotatably journaled through opposing walls of the element.

14. The invention of claim 13, wherein said shaft ends terminate in bells.

15. The invention of claim 1, wherein said handle is hollow and compressible and has a wall provided with finger receiving indentations and means mounted in the handle and actuated by the finger receiving indentations for producing a noise.

16. The invention of claim 1, wherein the pivot point of universal movement of the element is disposed within the end of the handle portion and adjacent the bottom portion of the hollow body portion, noise producing means disposed in said handle portion, said handle portion and body portion being separated from each other by a wall which isolates the body portion and handle portion from each other.

17. The invention of claim 16, wherein said element is in the form of a simulated animal having a body portion and at least one appendage movable in relation to the body portion thereof, and noise producing means associated with said animal for actuation upon movement thereof.

References Cited
UNITED STATES PATENTS

| | | | |
|---|---|---|---|
| 1,576,231 | 3/1926 | Cohn | 46—193 X |
| 1,580,551 | 4/1926 | Zadek | 46—193 |
| 1,627,166 | 5/1927 | Feldstein | 46—193 X |
| 2,618,899 | 11/1952 | Nudelman | 46—193 |

ROBERT PESHOCK, Primary Examiner

ROBERT F. CUTTING, Assistant Examiner

U.S. Cl. X.R.

46—177, 193